United States Patent
Lambolez

(10) Patent No.: US 7,946,812 B2
(45) Date of Patent: May 24, 2011

(54) AIR BLOWING DEVICE FOR COOLING THE INTERNAL COMBUSTION ENGINE OF A VEHICLE TESTED ON A ROLLER BENCH

(75) Inventor: Matthieu Lambolez, Paris (FR)

(73) Assignee: RENAULT s.a.s, Boulogne Billancourt (FR)

( * ) Notice: Subject to any disclaimer, the term of this patent is extended or adjusted under 35 U.S.C. 154(b) by 1009 days.

(21) Appl. No.: 11/722,051

(22) PCT Filed: Dec. 14, 2005

(86) PCT No.: PCT/FR2005/051086
§ 371 (c)(1),
(2), (4) Date: Jun. 18, 2007

(87) PCT Pub. No.: WO2006/064162
PCT Pub. Date: Jun. 22, 2006

(65) Prior Publication Data
US 2009/0266525 A1    Oct. 29, 2009

(30) Foreign Application Priority Data
Dec. 16, 2004 (FR) .................. 04-13411

(51) Int. Cl.
*F01D 25/26* (2006.01)

(52) U.S. Cl. .......... 415/213.1; 415/211.2; 415/232; 415/220

(58) Field of Classification Search ........... 415/121.3, 415/176, 182.1, 201, 208.1, 211.2, 219.1, 415/232, 213.1, 220; 73/114.68, 116.01, 73/116.02, 116.03, 116.05, 116.06, 116.07, 73/116.08, 116.09, 118.01, 118.02, 118.03, 118.04

See application file for complete search history.

(56) References Cited

U.S. PATENT DOCUMENTS

| 3,057,192 | A | * | 10/1962 | Huffman et al. | ........... 73/116.06 |
| 3,837,581 | A | * | 9/1974 | Orsoff | ........... 239/289 |
| 3,926,043 | A |   | 12/1975 | Marshall et al. | |
| 3,940,978 | A | * | 3/1976 | Akkerman et al. | ........ 73/116.09 |
| 4,161,116 | A |   | 7/1979 | Fegraus et al. | |
| 4,468,955 | A | * | 9/1984 | Yamasaki et al. | ........... 73/116.06 |
| D282,396 | S | * | 1/1986 | Weaver | ........ D23/383 |
| 4,799,390 | A | * | 1/1989 | Kimura | ........... 73/865.6 |

(Continued)

FOREIGN PATENT DOCUMENTS

DE    37 15 016    6/1993

(Continued)

*Primary Examiner* — Edward Look
*Assistant Examiner* — Aaron R Eastman
(74) *Attorney, Agent, or Firm* — Oblon, Spivak, McClelland, Maier & Neustadt, L.L.P.

(57) ABSTRACT

An air blowing device for cooling an internal combustion engine of a vehicle tested on a roller bench, including an air blowing fan configured to blow air towards the air intake opening provided on the vehicle to direct an air stream towards members cooling the engine, including a nozzle arranged between the outlet opening of the air blowing fan and the opening provided on the vehicle. The nozzle has a cross-section relative to the air stream gradually tapering between the outlet opening of the fan and the inlet opening of the vehicle. The nozzle includes two side walls each having an opening allowing a strap to pass, wherein one of the ends is configured to be attached to the vehicle and the other end is configured to be attached to a fixed vertical wall arranged proximate the outlet of the fan.

7 Claims, 3 Drawing Sheets

U.S. PATENT DOCUMENTS

| | | | |
|---|---|---|---|
| 4,964,298 A | | 10/1990 | Matsushita |
| 5,010,763 A | * | 4/1991 | Schneider ................. 73/116.09 |
| 5,148,512 A | * | 9/1992 | Owens ......................... 392/383 |
| 5,157,757 A | * | 10/1992 | McDougall ................. 392/383 |
| 5,526,675 A | | 6/1996 | Ratton |
| 5,533,388 A | * | 7/1996 | Yamamoto et al. ........ 73/116.01 |
| 5,661,910 A | * | 9/1997 | Schepisi ........................... 34/97 |
| 5,777,243 A | | 7/1998 | Kewish |
| 6,044,696 A | * | 4/2000 | Spencer-Smith .......... 73/118.01 |
| D426,674 S | * | 6/2000 | Kwong ......................... D28/18 |
| 6,210,270 B1 | * | 4/2001 | Niksic et al. ................. 454/338 |
| 6,505,503 B1 | * | 1/2003 | Teresi et al. ............... 73/118.01 |
| 6,922,909 B2 | * | 8/2005 | Andrew et al. ................... 34/96 |
| 7,568,382 B2 | * | 8/2009 | Pruszenski ................ 73/114.15 |
| 7,743,650 B2 | * | 6/2010 | Engstrom ................. 73/114.68 |
| 2002/0043102 A1 | | 4/2002 | Cordes |
| 2002/0152799 A1 | | 10/2002 | Gleason |
| 2004/0163274 A1 | * | 8/2004 | Andrew et al. ..................... 34/98 |
| 2005/0198854 A1 | * | 9/2005 | Hobe ................................. 34/96 |
| 2008/0295587 A1 | * | 12/2008 | Pruszenski ................ 73/116.05 |
| 2009/0126510 A1 | * | 5/2009 | Engstrom ................. 73/862.14 |
| 2010/0107750 A1 | * | 5/2010 | Engstrom et al. .......... 73/116.05 |

FOREIGN PATENT DOCUMENTS

| | | |
|---|---|---|
| DE | 0 857 959 | 8/1998 |
| DE | 202 18 050 | 4/2004 |
| DE | 200 01 978 | 5/2005 |
| EP | 1 215 474 | 6/2002 |

* cited by examiner

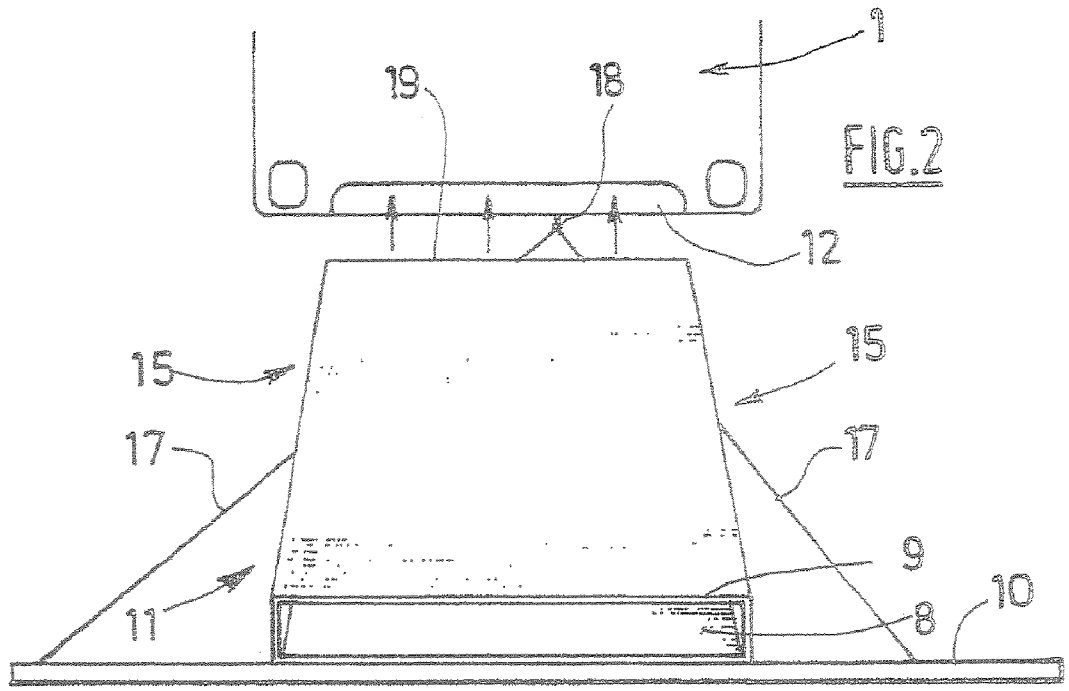
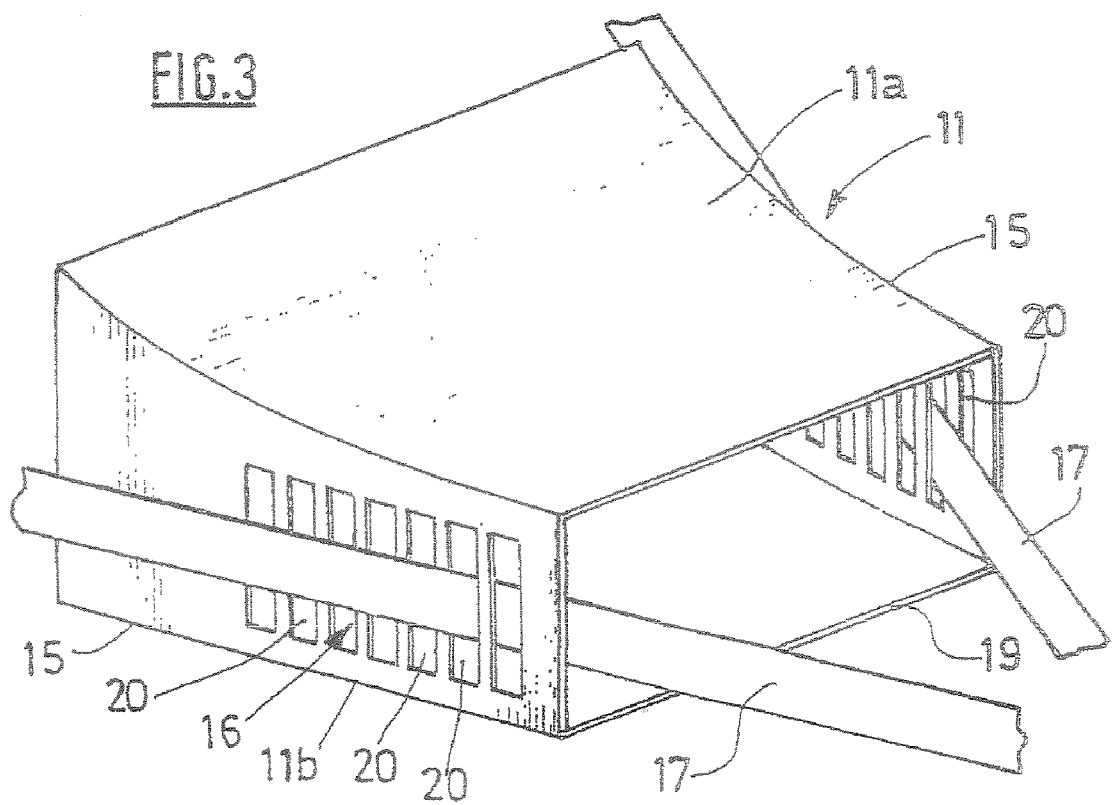

AIR BLOWING DEVICE FOR COOLING THE INTERNAL COMBUSTION ENGINE OF A VEHICLE TESTED ON A ROLLER BENCH

BACKGROUND

The present invention relates to an air blower for cooling the internal-combustion engine of a motor vehicle being tested on a roller-type test rig.

Known blowers comprise an air blower fan designed to blow air to ward the inlet opening formed in the front of the vehicle in order to direct the air stream at the engine radiator.

When the vehicle is traveling along the road, the above air stream is created by the movement of the vehicle through the air.

When a vehicle is being tested on a roller-type test rig, the above air stream has to be created by an air blower fan to prevent overheating of the combustion engine.

Ideally, the fan would be able to create an air stream identical to that which enters the air inlet opening formed in the front of the vehicle when the vehicle is traveling at the permitted speeds on the road.

Known air blowers cannot recreate the above ideal conditions as they are unable to concentrate the air stream efficiently into the air inlet opening of the vehicle.

BRIEF SUMMARY

It is an object of the present invention to solve this problem.

The present invention makes it possible to concentrate the air stream produced by the fan into the air inlet opening of the vehicle as it is being tested on the roller-type test rig, so that the air inlet opening receives an air stream comparable with the air stream it receives when the vehicle is traveling on the road.

When the vehicle is being tested on a roller-type test rig, it has a tendency to wander sideways on the rollers. To stop this happening, the vehicle is tied down with straps. However, it is difficult to position the nozzle here with the straps in the way.

It is another object of the present invention to solve this problem.

In accordance with the invention, the air blower for cooling the internal-combustion engine of a motor vehicle being tested on a roller-type test rig comprising an air blower fan designed to blow the air toward the air inlet opening of the vehicle in order to direct the air stream toward the engine cooling components, comprising a nozzle mounted between the outlet opening of the air blower fan and said opening of the vehicle, this nozzle having a cross section at right angles to the air stream that decreases progressively between said outlet opening of the fan and said inlet opening of the vehicle; which blower is characterized in that said nozzle comprises two side walls, each having an opening for the passage of a strap, one of whose ends is designed to be fixed to the vehicle and the other to a fixed vertical wall positioned near the outlet of the fan.

When the two straps are fixed, they preferably converge on a fixing point on the vehicle in such a way that each enters through one of the side openings of the nozzle and passes out of said nozzle through its outlet.

This vehicle fixing point can be its towing hook.

In a preferred version of the invention, each of the side openings in the nozzle is made up of a series of parallel vertical slots, each slot being of a width suitable for the passage of one of the two straps.

This arrangement makes it possible to adjust the positions of the straps to suit the vehicle being tested, particularly to suit the location of its towing hook, which varies from vehicle to vehicle.

The slots other than the slot being used for the passage of one of the straps are preferably closed off with removable slats.

This arrangement prevents the air stream escaping through slots through which no strap has been passed.

In accordance with other advantageous features of the invention:
- the nozzle inlet is connected in an essentially airtight manner to the outlet of the blower fan;
- the cross section of the outlet of the nozzle corresponds approximately to the average cross section of inlet openings provided on the majority of production vehicles;
- the transverse cross section of the nozzle is basically rectangular;
- the top wall of the nozzle is rounded and its bottom wall is flat and approximately parallel to the ground.

BRIEF DESCRIPTION OF THE DRAWINGS

Other features and advantages of the invention will also be disclosed in the description given below.

In the accompanying drawings, given as non-restrictive examples:

FIG. 2 is a plan view of the blower and the front end of the vehicle, FIG. 3 is a perspective view of the nozzle of the blower according to the invention, showing where the two vehicle tie-down straps pass through it.

DETAILED DESCRIPTION

Figure 1:
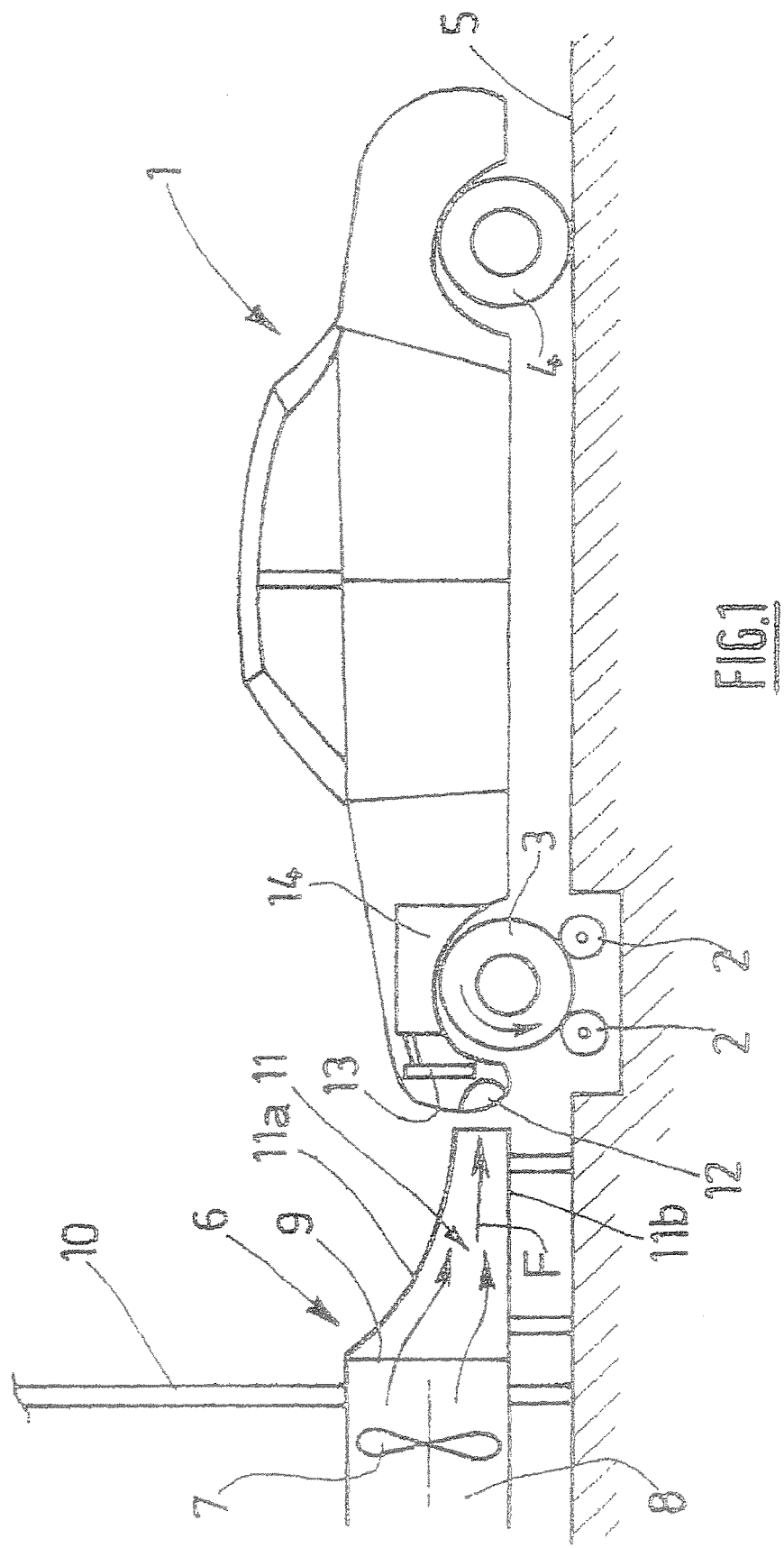
FIG. 1 is a general schematic showing in longitudinal section a blower according to the invention positioned in front of a vehicle being tested on a roller-type test rig.

FIG. 1 shows a motor vehicle 1 in position on a roller 2 type test rig. As it is a front-wheel drive vehicle, the two front wheels 3 of the vehicle 1 rest on the two rollers 2 and cause them to rotate.

The rear wheels 4 of the vehicle 1 rest on the ground 5.

An air blower 6 is installed in front of the vehicle 1. This blower comprises a fan 7 which rotates on a horizontal axis inside a duct 8 whose outlet opening 9 emerges from the surface of a wall 10 adjacent to the vehicle 1.

The invention places a nozzle 11 between the outlet opening 9 of the fan 7 duct 8 and the opening 12 in the front of the vehicle 1, and directs the air stream F toward the engine 14 cooling radiator 13.

The cross section of the nozzle 11 at right angles to the air stream F decreases progressively between the outlet opening 9 of the fan 7 duct 8 and the air inlet opening 12 of the vehicle 1.

As FIGS. 2 and 3 show, the nozzle 11 has two side walls 15, in each of which an opening 16 allows a strap 17 to be fed through so that one of its ends can be fixed (see FIG. 2) to the vehicle and the other to the vertical wall 10 from which the outlet 9 of the fan 7 duct emerges.

As will be seen in FIG. 2, when the two straps 17 are secured, they converge on a fixing point 18 consisting of the vehicle's towing hook. Each strap 17 passes in through an opening 16 in the side of the nozzle 11 and passes out again through its outlet 19.

Each side opening 16 is formed by a grille presenting a series of parallel vertical slots 20 of a width suitable for one of the two straps 17 to pass through it.

Figure 4:
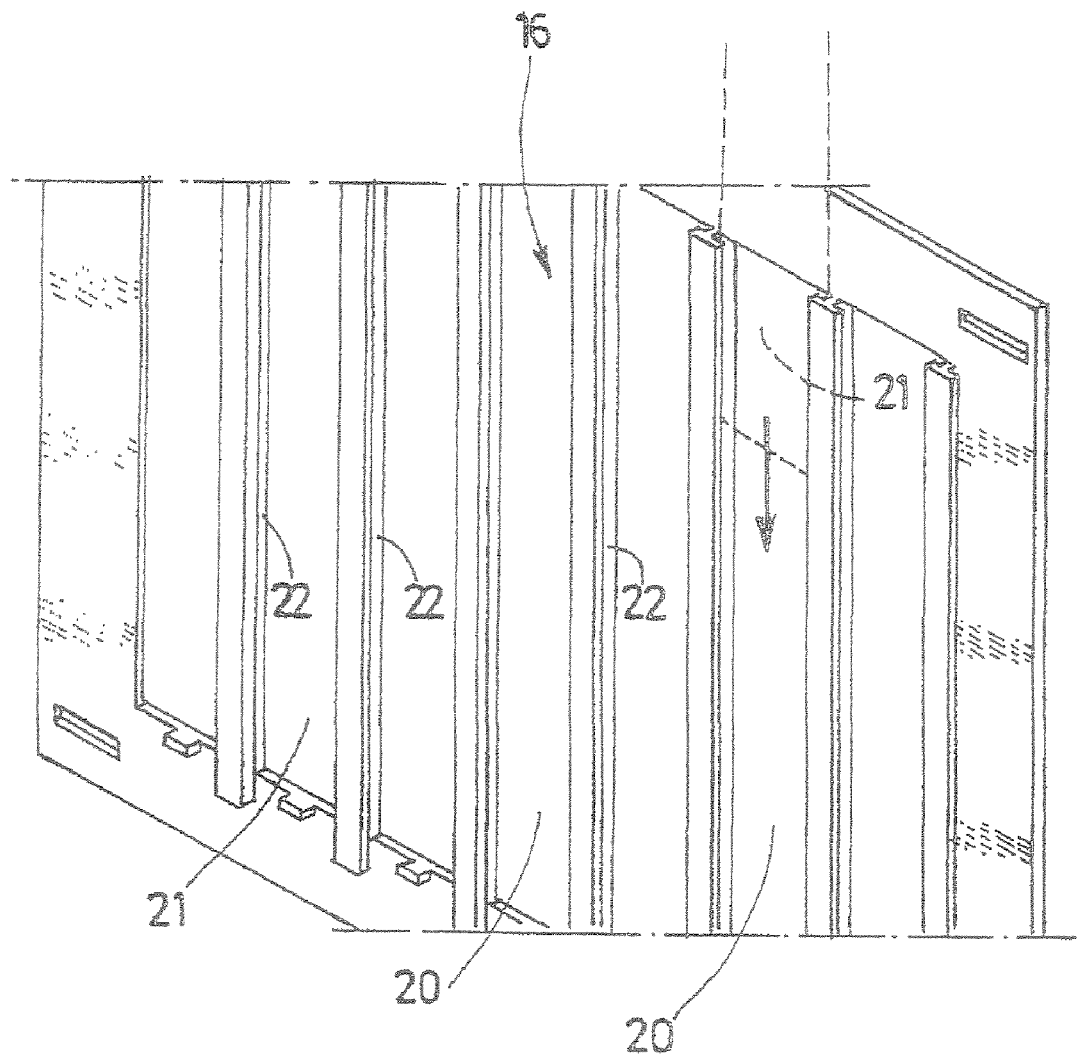
FIG. 4 is a partial perspective view of one of the side openings of the nozzle.

In each grille of the side openings 16, slots 20 other than that through which a strap 17 is passed can be closed off with removable slats, such as the slat 21 shown in dashed lines in FIG. 4.

In the example shown in FIG. 4, the slots 20 have a channel 22 on each side in which a slat 21 can be slid and held.

The slots 20 of the side openings 16 of the nozzle 11 allow the spatial position of the straps 17 to be adjusted to suit the characteristics of the vehicle 1, especially the position of its towing hook 18.

The blower nozzle 11 is therefore suitable for a great variety of vehicles.

In addition, the slats 21 which close off any slots 20 not being used for the straps reduce the leakage of the air stream through the sides of the nozzle 11.

As a further means of limiting leakage of the air stream, the inlet of the nozzle 11 is connected in an essentially airtight manner (see FIG. 2) to the outlet 9 of the blower fan 7 duct.

For this reason, the outlet 19 of the nozzle 11 is positioned as close as possible to the air inlet opening 12 of the vehicle 1.

The cross section of the outlet 19 of the nozzle 11 would likewise ideally match that of the air inlet opening 12 of the vehicle 1.

However, so that the nozzle 11 can be used for a wide variety of production vehicles, the nozzle 11 is designed in such a way that the cross section of its outlet 19 matches the average cross section of inlet openings 12 provided on these vehicles.

In the example shown in FIGS. 1-3, the transverse cross section of the nozzle 11 is rectangular. Also, its top wall 11*a* is rounded and its bottom wall 11*b* is flat and approximately parallel to the ground 5.

The rounded shape of the top wall 11*a* is to minimize turbulence.

The blower described above is capable of creating an air stream whose speed at the outlet of the nozzle 11 can be as much as 130 km/h, comparable with the air stream entering the front opening 12 of the vehicle when driven on the road at the above speed of 130 km/h.

It is thus possible with the invention to put test vehicles on a roller-type test rig under the same cooling conditions as they encounter on the road.

The invention claimed is:

1. An air blower for cooling an internal-combustion engine of a motor vehicle being tested on a roller-type test rig, including an air blower fan configured to blow air toward an air inlet opening of the vehicle to direct an air stream toward engine cooling components, comprising:
    a nozzle mounted between an outlet opening of the air blower fan and the air inlet opening of the vehicle, the nozzle having a cross section at right angles to the air stream that decreases progressively between the outlet opening of the fan and the air inlet opening of the vehicle; and
    two straps, wherein a first end of each of the two straps is configured to be fixed to the vehicle and a second end of each of the two straps is configured to be fixed to a fixed vertical wall positioned near the outlet opening of the fan,
    wherein the nozzle comprises two side walls, each having an opening for passage of one of the two straps, and
    wherein, on each of the two side walls of the nozzle, the opening includes a series of parallel vertical slots, each slot having a width configured for passage of one of the two straps.

2. The air blower as claimed in claim 1, wherein when each of the two straps is fixed, the two straps converge on a fixing point on the vehicle such that each of the two straps enters through one of the openings of the nozzle and passes out of the nozzle through an outlet of the nozzle.

3. The air blower as claimed in claim 2, wherein the fixing point of the vehicle is a towing hook.

4. The air blower as claimed in claim 1, wherein slots other than the slot being used for the passage of one of the two straps are closed off with removable slats.

5. The air blower as claimed in claim 1, wherein the nozzle inlet is connected in a substantially airtight manner to the outlet opening of the fan.

6. The air blower as claimed in claim 1, wherein a transverse cross section of the nozzle is basically rectangular.

7. The air blower as claimed in claim 6, wherein a top wall of the nozzle is rounded and a bottom wall of the nozzle is flat and approximately parallel to the ground.

\* \* \* \* \*